United States Patent
Thubert et al.

(10) Patent No.: US 9,813,340 B2
(45) Date of Patent: Nov. 7, 2017

(54) CLASS-AWARE LOAD BALANCING USING DATA-PLANE PROTOCOL IN A LOOP-FREE MULTIPLE EDGE NETWORK TOPOLOGY

(71) Applicant: Cisco Technology, Inc., San Jose, CA (US)

(72) Inventors: Pascal Thubert, La Colle sur Loup (FR); Dirk Anteunis, Fayence (FR); Patrice Bellagamba, Saint-Raphael (FR); David Delano Ward, Somerset, WI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 206 days.

(21) Appl. No.: 14/754,922

(22) Filed: Jun. 30, 2015

(65) Prior Publication Data
US 2017/0006497 A1   Jan. 5, 2017

(51) Int. Cl.
| | |
|---|---|
| H04W 28/08 | (2009.01) |
| H04L 12/751 | (2013.01) |
| H04L 12/743 | (2013.01) |
| H04L 12/801 | (2013.01) |
| H04L 12/803 | (2013.01) |

(52) U.S. Cl.
CPC ............ *H04L 47/11* (2013.01); *H04L 47/125* (2013.01)

(58) Field of Classification Search
CPC .... H04W 28/08; H04L 45/02; H04L 45/7453; H04L 47/11
See application file for complete search history.

(56) References Cited

U.S. PATENT DOCUMENTS

| | | | |
|---|---|---|---|
| 8,861,340 B1 | 10/2014 | Atlas | |
| 8,897,135 B2 | 11/2014 | Thubert et al. | |
| 2004/0254984 A1* | 12/2004 | Dinker | H04L 67/34 709/205 |
| 2012/0300668 A1 | 11/2012 | Thubert et al. | |
| 2013/0208594 A1* | 8/2013 | Thubert | H04L 47/125 370/235 |
| 2013/0301470 A1 | 11/2013 | Thubert et al. | |

(Continued)

OTHER PUBLICATIONS

Dynamic Source Routing in Ad Hoc Wireless Networks, Johnson, 1996.*

(Continued)

*Primary Examiner* — Ronald B Abelson
(74) *Attorney, Agent, or Firm* — Leon R. Turkevich

(57) ABSTRACT

In one embodiment, a method comprises detecting a traffic condition by a network device in a loop-free routing topology comprising routing arcs for reaching a destination device, each routing arc comprising a first edge, a second edge, and at least a third network device configured for routing any network traffic along the routing arc toward the destination device and exiting via any one of the first or second edges of the routing arc, the traffic condition proximate to the first edge of at least one of the routing arcs in which the network device is positioned; and the network device initiating load balancing based on sending a management frame over a data plane of the at least one routing arc toward the corresponding second edge, the management frame requesting a change in load balancing for at least one of an identified traffic class based on the detected traffic condition.

20 Claims, 13 Drawing Sheets

(56) References Cited

U.S. PATENT DOCUMENTS

| | | |
|---|---|---|
| 2014/0029416 A1 | 1/2014 | Ceccarelli et al. |
| 2014/0036729 A1 | 2/2014 | Thubert et al. |
| 2014/0078927 A1 | 3/2014 | Thubert et al. |
| 2014/0098711 A1 | 4/2014 | Thubert et al. |
| 2014/0122741 A1 | 5/2014 | Thubert et al. |
| 2014/0233422 A1 | 8/2014 | Thubert et al. |
| 2015/0163091 A1 | 6/2015 | Thubert et al. |
| 2016/0099865 A1* | 4/2016 | Klincewicz ............ H04L 45/28 370/218 |

OTHER PUBLICATIONS

Melakessou et al., "Towards a New Way of Reliable Routing: Multiple Paths over ARCs", [online], [retrieved on Dec. 7, 2014]. Retrieved from the Internet: <URL: https://orbilu.uni.lu/handle/10993/20002>, 7 pages.

Enyedi, Ed., et al., "Algorithms for computing Maximally Redundant Trees for IP/LDP Fast-Reroute", Routing Area Working Group, Internet Draft, [online], Mar. 9, 2015, [retrieved on Jun. 11, 2015]. Retrieved from the Internet: <URL: https://tools.ietf.org/pdf/draft-ietf-rtgwg-mrt-frr-algorithm-03.pdf>, pp. 1-64.

Atlas, Ed., et al., "An Architecture for IP/LDP Fast-Reroute Using Maximally Redundant Trees", Routing Area Working Group, Internet Draft, [online], Jan. 19, 2015, [retrieved on Jun. 17, 2015]. Retrieved from the Internet: <URL: https://tools.ietf.org/pdf/draft-ietf-rtgwg-mrt-frr-architecture-05.pdf>, pp. 1-41.

Thubert, Ed., et al., "Available Routing Constructs", RTGWG Internet Draft, [online], Jan. 22, 2015, [retrieved on Jun. 11, 2015]. Retrieved from the Internet: <URL: http://tools.ietf.org/pdf/draft-thubert-rtgwg-arc-03.pdf>, pp. 1-21.

White, "Maximally Redundant Trees", [online], Dec. 31, 2013, [retrieved on Jun. 17, 2015]. Retrieved from the Internet: <URL: http://packetpushers.net/maximally-redundant-trees/>, pp. 1-4.

Ramakrishnan et al., "The Addition of Explicit Congestion Notification (ECN) to IP", Network Working Group, Request for Comments: 3168, Sep. 2001, pp. 1-63.

Claise, Ed., et al., "Specification of the IP Flow Information Export (IPFIX) Protocol for the Exchange of Flow Information", Internet Engineering Task Force, Request for Comments: 7011, Sep. 2013, pp. 1-76.

D'Antonio et al., "Flow Selection Techniques", Internet Engineering Task Force, Request for Comments: 7014, Sep. 2013, pp. 1-33.

Melakessou, "Network Analysis and Routing Evaluation: The Narval Module", [online], SCILABTEC May 15-16, 2014, 6th International Users Conference, [retrieved on Dec. 7, 2014]. Retrieved from the Internet: <URL: https://orbilu.uni.lu/bitstream/10993/20384/1/UniversityLuxembourg_ScilabTEC2014.pdf> 13 pages.

Wikipedia, "Differentiated services", [online], May 16, 2015, [retrieved on Jun. 11, 2015]. Retrieved from the Internet: <URL: http://en.wikipedia.org/w/index.php?title=Differentiated_services&printable=yes>, pp. 1-6.

Wikipedia, "Operations, administration and management", [online], Feb. 2, 2015, [retrieved on Jun. 11, 2015]. Retrieved from the Internet: <URL: http://en.wikipedia.org/w/index.php?title=Operations,_administration_and_management&printable=yes>, pp. 1-2.

Wikipedia, "Traffic shaping", [online], Jun. 6, 2015, [retrieved on Jun. 18, 2015]. Retrieved from the Internet: <URL: https://en.wikipedia.org/w/index.php?title=Traffic_shaping&printable=yes>, pp. 1-6.

Bensley et al., "Datacenter TCP (DCTCP): TCP Congestion Control for Datacenters", [online], Feb. 14, 2014 [retrieved on Jan. 12, 2016]. Retrieved from the Internet: <URL: https://tools.ietf.org/html/draft-bensley-tcpm-dctcp-00>, pp. 1-8.

* cited by examiner

| DSCP | FLOW HASH RANGE 1 | FLOW HASH RANGE 2 | FLOW HASH RANGE 3 | ... | FLOW HASH RANGE n | TOTAL THROUGHPUT |
|---|---|---|---|---|---|---|
| CS0 | | | | | | |
| CS1 | | | | | | |
| AF11 | | | -Y bps | | | |
| AF12 | | | | | | |
| AF13 | | | | | | |
| CS3 | | | | | | |
| ... | | | | | | |

FIG. 6E

| DSCP | FLOW HASH RANGE 1 | FLOW HASH RANGE 2 | FLOW HASH RANGE 3 | ... | FLOW HASH RANGE n | TOTAL THROUGHPUT |
|---|---|---|---|---|---|---|
| CS0 | | | | | | |
| CS1 | | | | | | |
| AF11 | | | -Y bps | | | |
| AF12 | | | | | | |
| AF13 | | | | | | |
| CS3 | | | | | | |
| ... | | | | | | |

FIG. 6F

CLASS-AWARE LOAD BALANCING USING DATA-PLANE PROTOCOL IN A LOOP-FREE MULTIPLE EDGE NETWORK TOPOLOGY

TECHNICAL FIELD

The present disclosure generally relates to class-aware load balancing using a data plane protocol in a loop-free multiple edge network topology.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A data network routes network traffic in the form of data packets to and from one or more destination devices via network links. A network topology is established that identifies one or more paths for reaching a destination device, enabling the data packets to be forwarded along the one or more paths. Particular concerns in deploying an effective network topology include ensuring that the network topology is resilient to link failures without the formation of loops, and ensuring that network traffic can be controlled based on effective load balancing techniques.

One proposed loop-free routing topology includes routing arcs that provide resilience to link failures: the routing arcs enable the network traffic to be routed along any of two ends of any routing arc; the routing arcs also enable instantaneous rerouting of network traffic to a destination device in response to a detected failure of a data link, based on reversing an identified reversible link within the routing arc. Load balancing in the loop-free routing topology is based on "intra-arc" traffic management within a routing arc by an "arc cursor" node having exclusive authority for determining the direction of data traffic within the routing arc, and "inter-arc" management between routing arcs based on propagation of backpressure commands by a given routing arc to a "parent" routing arc supplying data traffic to the given routing arc.

BRIEF DESCRIPTION OF THE DRAWINGS

Reference is made to the attached drawings, wherein elements having the same reference numeral designations represent like elements throughout and wherein:

FIGS. 6A-6F illustrate example data structures generated by the network devices for load balancing of identified traffic classes in the loop-free routing topology of FIG. 1, according to an example embodiment.

DESCRIPTION OF EXAMPLE EMBODIMENTS

Overview

Figure 1:
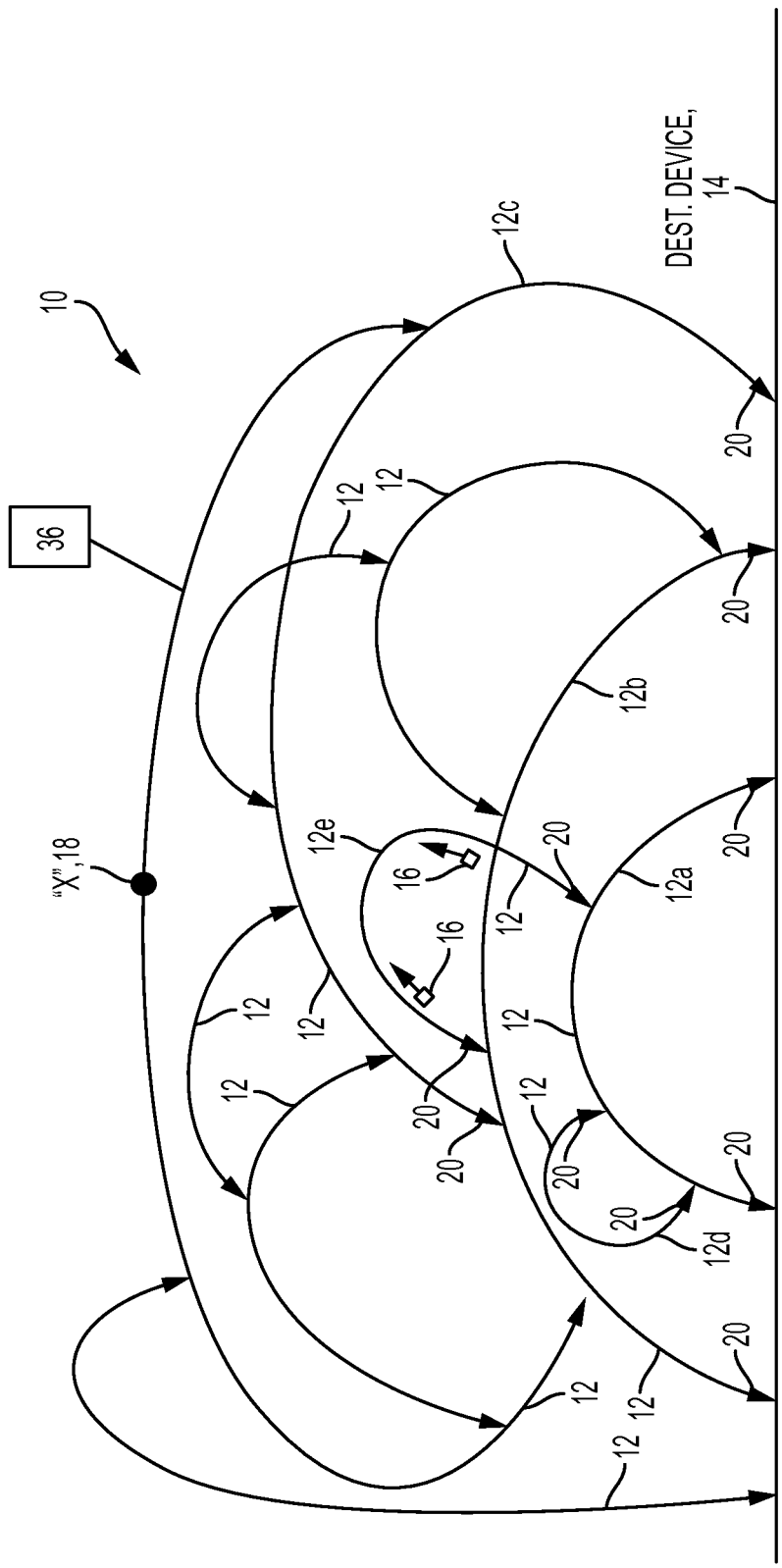
FIG. 1 illustrates an example loop-free routing topology comprising a plurality of routing arcs for reaching a destination device based on class-aware load balancing of an identified traffic class, according to an example embodiment.

In one embodiment, a method comprises detecting a traffic condition by a network device in a loop-free routing topology comprising routing arcs for reaching a destination device, each routing arc comprising a first edge, a second edge, and at least a third network device configured for routing any network traffic along the routing arc toward the destination device and exiting via any one of the first or second edges of the routing arc, the traffic condition proximate to the first edge of at least one of the routing arcs in which the network device is positioned; and the network device initiating load balancing based on sending a management frame over a data plane of the at least one routing arc toward the corresponding second edge, the management frame requesting a change in load balancing for at least one of an identified traffic class based on the detected traffic condition.

In another embodiment, an apparatus comprises a processor circuit and a device interface circuit. The processor circuit is configured for detecting a traffic condition in a loop-free routing topology comprising routing arcs for reaching a destination device. Each routing arc comprises a first edge, a second edge, and at least a third network device configured for routing any network traffic along the routing arc toward the destination device and exiting via any one of the first or second edges of the routing arc. The traffic condition is proximate to the first edge of at least one of the routing arcs in which the apparatus is positioned as a network device. The processor circuit further is configured for initiating load balancing based on generating a management frame requesting a change in load balancing for at least one of an identified traffic class based on the detected traffic condition. The device interface circuit is configured for sending the management frame over a data plane of the at least one routing arc toward the corresponding second edge, for initiating of the load balancing.

In another embodiment, or more non-transitory tangible media is encoded with logic for execution by a machine and when executed by the machine operable for: detecting a traffic condition by the machine implemented as a network device in a loop-free routing topology comprising routing arcs for reaching a destination device, each routing arc comprising a first edge, a second edge, and at least a third network device configured for routing any network traffic along the routing arc toward the destination device and exiting via any one of the first or second edges of the routing arc, the traffic condition proximate to the first edge of at least one of the routing arcs in which the network device is positioned; and the network device initiating load balancing based on sending a management frame over a data plane of the at least one routing arc toward the corresponding second edge, the management frame requesting a change in load balancing for at least one of an identified traffic class based on the detected traffic condition.

DETAILED DESCRIPTION

Particular embodiments enable load balancing of identified traffic classes in a loop-free routing topology using management frames sent over routing arcs according to a data-plane protocol. The loop-free routing topology is created for reaching a destination device, and comprises plural routing arcs for reaching the destination device via any one of first or second edges of each routing arc. The exchange of management frames according to the data-plane protocol enables each network device in a routing arc to participate in implementing load-balancing decisions for the propagation of the identified traffic classes through the routing arc for exiting via either of the first or second edges.

Hence, the exchange of management frames over the data plane of a routing arc enables identified traffic classes, and even selected subsets (i.e., "ranges") of the identified traffic classes, to be propagated to either edge of the routing arc based on negotiation and implementation of traffic policies between the network devices in the routing arc, independent of any arc cursor in the routing arc that would otherwise be used to control network traffic in the routing arc. Hence, an identified traffic class (or selected subset thereof) can be redirected through a routing arc by the network devices, independent of any arc cursor, based on negotiated traffic policies. Example traffic policies can include redirecting lower-priority (e.g., low Quality of Service (QoS)) traffic, allocation of bandwidth or throughput among the selected subsets of the identified traffic classes, traffic shaping among the selected subsets of the identified traffic classes (e.g., due to data bursts, etc.), etc.

Hence, the example embodiments can provide traffic shaping in the loop-free routing topology, independent of any arc cursor, based on exchange of management frames over the data plane of one or more routing arcs for negotiation and implementation of traffic polices. The traffic shaping provided by the example embodiments can minimize dropped packets due to congestion or backpressure commands, since network devices in a routing arc can "tune" traffic flows based on the management frames.

FIG. 1 is a diagram illustrating an example data network of network devices, where the data network has a loop-free routing topology 10 comprising routing arcs 12 for reaching a destination device 14 based on class-aware load balancing provided by data-plane management frames 16, according to an example embodiment. The data network can be a standalone network or a subnetwork of a larger network such as a local area network (LAN), a Wide Area Network (WAN), etc. The data network can be implemented via any type of data link layer protocol, for example a low-power wireless network (e.g., a Low-Power and Lossy Network), a wired network, etc. The network devices 18 of the data network can be connected by wired or wireless data links (e.g., a mesh network), and a routing topology overlying the data links can be constructed for reaching a corresponding network device 18. The "destination device" 14 can be any network device in the data network; hence, each network device in a data network can have its own corresponding loop-free routing topology 10 constructed to ensure reachability to the "destination" device 14 via its own set of routing arcs 12.

Each routing arc 12 comprises a plurality of network devices 18 each having at least two data links for reaching adjacent network nodes (for simplicity, FIG. 1 illustrates only one of the multiple network devices 18 as network device "X" 18). Each routing arc 12 has at least two edges 20, illustrated as "arrowheads" 20 in FIG. 1, where network traffic can be routed along any routing arc 12 toward the destination device 14, and exit the routing arc 12, via any one of the first or second edges 20 of the routing arc 12. As illustrated in FIG. 1, two edges 20 of the routing arc 12a and routing arc 12b exit at the destination device 14; one edge 20 of the routing arc 12c exits at the destination device 14 while another edge 20 of the routing arc 12c exits at the routing arc 12b; two edges 20 of the routing arc 12d exit at the routing arc 12a; and one edge 20 of the routing arc 12e exits at the routing arc 12a while another edge 20 of the routing arc 12e exits at the routing arc 12b.

Hence, the edge 20 of each routing arc 12 provides an exit point for data traffic from the routing arc 12 to either a "downstream" arc or the destination device 14. Although not shown in FIG. 1, a routing arc 12 can have more than two edges 20 (in which the third edge 20 can be based on a buttressing arc that converts a routing arc into a comb structure), illustrated for example in U.S. Patent Publication No. 2013/0301470.

As apparent from FIG. 1, the loop-free routing topology 10 guarantees that any network device 18 along any point of any arc routing 12 (e.g., network device "X" in FIG. 1) has at least two non-congruent paths for reaching the destination device 14, guaranteeing reachability to the destination device 14 even if a link failure is encountered in the loop-free routing topology 10. The term "node" in the specification and claims refers to a network device (i.e., apparatus, machine, etc.) that is assigned an identifiable position within the routing topology 10.

The loop-free routing topology 10 for each destination device 14 can be constructed based on operations executed by one or more network routers, a centralized server, a network management entity, etc. For example, a network controller device 36 can at least initially establish the loop-free routing topology 10 and provide high-level control of the loop-free routing topology 10 based on sending control plane Operations, Administration, and Maintenance (OAM) messages to each of the network devices 18 in the data network. The OAM messages are also referred to herein as "OAM frames". The routing arcs 12 forming the loop-free routing topology 10 can be constructed from one or more directed acyclic graphs (DAGs), one or more a tree-based topologies (e.g., a maximally-redundant tree (MRT)), split-ring topologies, etc.). Additional example techniques for creating the loop-free routing topology 10 are described in U.S. Patent Publication No. 2012/0300668, U.S. Patent Publication No. 2013/0301470, U.S. Patent Publication No. 2014/0078927, U.S. Patent Publication No. 2015/0163091, and/or U.S. Pat. No. 8,897,135.

The loop-free routing topology as described in each of U.S. Patent Publication No. 2012/0300668, U.S. Patent Publication No. 2013/0301470, U.S. Patent Publication No. 2014/0078927, U.S. Patent Publication No. 2015/0163091, and/or U.S. Pat. No. 8,897,135, is based on an assumption that each routing arc 12 includes one and only one arc cursor that provides exclusive control of directing the network traffic along the corresponding routing arc and away from any network device having possession of the arc cursor; hence, these prior descriptions of the loop-free routing topology describe that network traffic in a routing arc is controlled exclusively by the network device having possession of the arc cursor, such that any change in control in a routing arc is based on transferring possession of the arc cursor from the network device having possession thereof to another network device within the routing arc.

Figure 2:
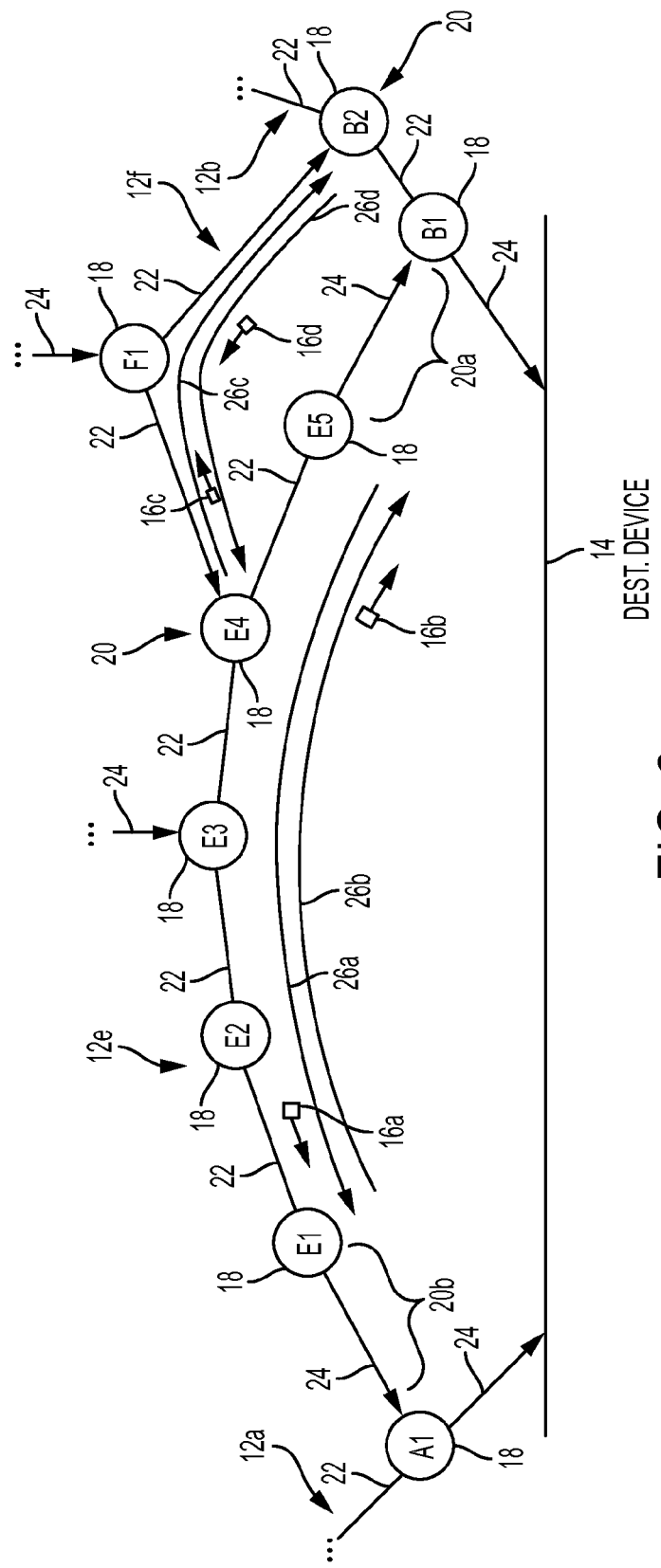
FIG. 2 illustrates an exchange of data plane management frames, specifying load-balancing information for identified traffic classes, within an example routing arc from the loop-free routing topology of FIG. 1 according to an example embodiment.

FIG. 2 illustrates an exchange of data-plane management frames 16 (e.g., 16a, 16b, 16c, and 16d) for initiating load balancing of identified traffic classes within example routing arcs (e.g., 12e and 12f) of the loop-free routing topology 10 of FIG. 1, according to an example embodiment. According to example embodiments, load balancing in the loop-free routing topology 10 can be executed between network devices (18 of FIGS. 1 and 2) based on the network devices 18 exchanging management frames 16 over a data plane of at least one routing arc 12, the data-plane management frames 16 specifying load-balancing information for identified traffic classes. In particular, control messages (e.g., OAM messages) sent in the control plane typically are unicast from a source device (e.g., a management entity device 36) to a targeted device (e.g., a managed device such as "E1" 18), such the control messages are parsed and interpreted only by the targeted device and are otherwise opaque to the intermediate network devices, i.e., no network device forwarding a control message from the source device 36 to the targeted device (e.g., "E1" 18) would parse or interpret the control message.

In contrast, the network devices 18 can receive and forward network traffic (e.g., data packets) along a routing arc 12 via their associated data links 22 (i.e., intra-arc links). Since network devices 18 "forward" network traffic to each other toward the destination device 14, the network devices 18 are deemed to forward the network traffic in a "forwarding plane" of the routing arcs 12 of the loop-free routing topology 10. The "forwarding plane" and the "data plane" are synonymous and may be used interchangeably. According to an example embodiment, the data-plane management frames 16 exchanged between network devices 18, also referred to as Joint Operation and Automation of the Network (JOAN) frames, enable each network device 18 receiving the data-plane management frame 16 to parse and interpret the received data-plane management frame 16 for selective execution of load balancing operations on at least one of an identified traffic class. A JOAN frame is a management frame that is sent over the data plane of at least one routing arc 12, and that can be parsed and interpreted by any network device 18 receiving the data-plane management frame 16. A data-plane management frame 16 can be generated and output by any network device 18 in any routing arc 12 at any time as appropriate, for example on a periodic basis and/or a triggering event.

A data-plane management frame 16 can be output or sent by a network device 18 over the data plane of a routing arc 12 (i.e., a data plane path 26) toward an edge 20 of the routing arc 12, enabling two or more network devices 18 in one or more routing arcs 12 to negotiate and implement traffic policies between the network devices 18 in the routing arc 12, independent of any arc cursor in the routing arc 12 that would otherwise be used to control network traffic in the routing arc.

Hence, the exchange of data-plane management frames 16 between network devices 18 enable the network devices 18 to negotiate and implement traffic policies as a substitute for an arc cursor. Alternatively, the exchange of data-plane management frames 16 between network devices 18 can be used in combination with an arc cursor.

As described in further detail below, the network devices "E5" 18 and "E1" 18 can exchange respective data-plane management frames 16a and 16b for initiation, negotiation, and implementation of load balancing of one or more identified traffic classes of network traffic that are forwarded along the intra-arc links 22 of the routing arc 12e. The network devices "E4" 18 and B2" 18 also can exchange respective data-plane management frames 16c and 16d for initiation, negotiation, and implementation of load balancing of one or more identified traffic classes of network traffic, that are forwarded from the network device "F1" (e.g., from a network device in an "upstream" routing arc (not shown in FIG. 2)), along one or more of the intra-arc links 22 of the collapsed routing arc 12f to the routing arc 12e or the routing arc 12b.

The "edge" 20 of a first routing arc 12 as used in this specification and the claims refers to an "end" point where a data packet exits the first routing arc 12 and either enters a second "downstream" routing arc 12, or enters an "edge link" 24 that couples the first routing arc 12 to either another (third) "downstream" routing arc 12 or to the destination device 14. As described in further detail, an "edge" 20 can refer to any one of an edge link 24, an edge junction (e.g., junction node "B2" or "E4") that belongs to a collapsed routing arc (e.g., 12f) and another routing arc 12, or an edge node (e.g., "E1", E5") that output data traffic to another routing arc (e.g., 12a or 12b) via an edge link 24. For example, the collapsed routing arc 12f has only network devices "F1" 18 for receiving network traffic from an "upstream" routing arc (not shown) via an edge link 24, an edge junction "E4" that enables the network traffic of the collapsed routing arc 12f to exit into the routing arc 12e, and an edge junction "B2" that enables the network traffic of the collapsed routing arc 12f to exit into the routing arc 12b. Hence, the edge junctions "E4" and "B2" can generate and transmit respective data-plane management frames 16c and 16d for load balancing of identified traffic classes in the collapsed routing arc 12f. An edge junction can belong to one or more collapsed routing arcs.

In contrast, the routing arc 12e comprises network devices "E1", "E2", "E3", "E4", and "E5", where the edge nodes "E1" and "E5" can generate and transmit respective data-plane management frames 16a and 16b for load balancing of identified traffic classes in the routing arc 12e. The network devices "A1" and "B1" are not edge nodes of the routing arc 12e because they will not participate in load balancing within the routing arc 12; however, the network device "A1" is an edge node of routing arc 12a and network device "B1" is an edge node of routing arc 12b. As described below, the intermediate network devices "E2", "E3", and "E4" (i.e., intermediate junction nodes) in between the edge nodes "E1" and "E5" also can generate and transmit a data-plane management frame 16, as appropriate.

A "junction" refers generally to a junction node: a junction node is defined as a network node (i.e., a network device identified based on its relative position within a network topology) that has at least two data links providing respective non-congruent paths for reaching the destination device: the term "non-congruent" in this specification and the attached claims requires that the paths from a junction node do not share any common data link for reaching the destination device 14, rather each link belonging to one path (from the junction node to the destination device) is distinct and independent of any link belonging to the second non-congruent path (from the junction node to the destination device). An intermediate junction is defined as a junction node (or "junction network device") that terminates two and only two bidirectional links, where all other links coupled to the intermediate junction are oriented inwards to avoid loops: a link can be safely reversed towards an intermediate junction. Hence, an intermediate junction consists of two bidirectional (or reversible if needed) links and zero or more inward oriented links from any other network node. A collapsed arc does not have any intermediate junction, and an edge junction can belong to one or more collapsed arcs.

An edge link 24 is a "one-way" wired or wireless data link that forwards data traffic in only one identified direction, whereas an intra-arc link 22 is a bidirectional wired or wireless data link that can forward data traffic in either direction (e.g., "left" or "right", "up" or "down", etc.). An intra-arc link 22 is distinct from a "reversible" link (as described in U.S. Patent Pub. 2012/0300668) in that a "reversible" link relied on the relative position of an arc cursor to "reverse" its direction; in contrast, the intra-arc 22 is bidirectional (i.e., both directions can be used simultaneously) because different data flows may flow in different directions simultaneously along a given routing arc 12.

An "heir" network node (or "heir" network device) is a network device (e.g., "A1" or "B1" of FIG. 2) that is directly connected to the destination device 14. The destination device 14 also can be referred to as a "root" network node. In other words, a destination device 14 in any loop-free routing topology 10 comprising routing arcs must have at least two heir network nodes (e.g. network nodes "A1" and "B1") that are directly connected to the destination device 14: if an intended destination network device has only one heir node, then the only-one heir network node is designated as the new root node (based on the definition of a root network node as having no second path to reach a resource). The heir network node is used to identify a "safe" network node: if a network node can reach the root node alternatively via either a first heir network node or a second heir network node, then the network node is considered a safe network node because it can route a packet to the root via two non-congruent paths, namely either via the first heir network node or via the second heir network node, guaranteeing reachability if one of the links toward the root node is broken.

As described in further detail below, a network device 18 (e.g., "E5") in a routing arc (e.g., 12e) can detect a traffic condition proximate to (i.e., near) a "first" edge (e.g., 20a) of the routing arc (e.g., at the edge node "E5" of the routing arc 12e or at the edge link 24 terminating at the node "B1" of routing arc 12b): the traffic condition can be based on the network device 18 comparing a traffic value with a traffic policy for an identified traffic class. The network device (e.g., "E5") 18 also can respond to the detected traffic condition at the edge 20 of the routing arc 12e based on initiating load balancing within the routing arc 12e: the initiating of load balancing is based on the "requesting" network device (e.g., "E5") 18 sending a data-plane management frame 16 over a data plane path 26a of the routing arc 12 (e.g., 12e) that requests a change in load balancing for the identified traffic class. As described in further detail below, if the "responding" edge node (e.g., "E1") 18 receiving the data-plane management frame 16a (via the data plane path 26a) accepts the change in load balancing, the "responding" edge node (e.g., "E1") 18 can output to the requesting network device "E5" (via the data plane path 26b along the routing arc 12e) a data-plane management frame 16b specifying that the change in load balancing is accepted.

Each intermediate network device 18 (e.g., "E2", "E3", and "E4") along the data plane path 26b can implement the accepted change (or refusal thereof) based on parsing and interpreting the data-plane management frame 16b in response to receipt and forwarding thereof toward the requesting edge node "E5" 18; if the data-plane management frame 16b specifies a change in load balancing is refused by the responding network device "E1", each intermediate network device 18 can update its forwarding table (84 of FIG. 3) to drop the identified traffic class and reroute ("push back") the identified traffic class on its incoming link; if the data-plane management frame 16b specifies a change in load balancing is accepted by the responding network device "E1", each intermediate network device 18 can update its forwarding table (84 of FIG. 3) to forward the identified traffic class toward the responding edge node E1".

Hence, the network devices 18 in a routing arc 12 can negotiate and implement changes in load balancing for one or more identified traffic classes. Load balancing changes also can be propagated "upward" to upstream routing arcs 12, if needed. The load balancing can include rerouting identified traffic classes for congestion avoidance, ensuring guaranteed QoS of prioritized traffic flows based on rerouting lower-QoS traffic classes, temporary rerouting of identified traffic flows due to bursty traffic, etc.

Figure 3:
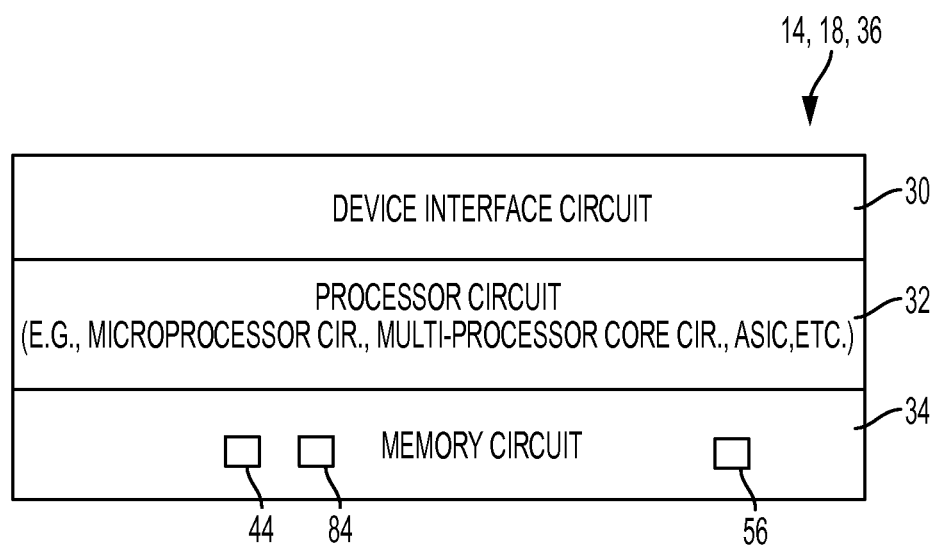
FIG. 3 illustrates an example apparatus implemented as any one of the network devices of FIG. 1 or 2 and configured for exchanging data plane management frames for load balancing of identified traffic classes, according to an example embodiment.

FIG. 3 illustrates an example apparatus implemented as any one of the network devices 14, 18 or 36 of FIG. 1, 2, or 5A-5C, according to an example embodiment. The apparatus 14, 18 or 36 is a physical machine (i.e., a hardware device) configured for implementing network communications with other physical machines 18 via the loop-free routing topology 10. The network controller 36 can be configured for communicating with the destination device 14 and each network device 18 using OAM frames in the control plane for configuration and network management operations, including creating the loop-free routing topology 10 for reaching an identified destination device 14. Each network device 18 is configured for exchanging data plane management frames 16 for load balancing of identified traffic classes destined for the destination device 14. The term "configured for" or "configured to" as used herein with respect to a specified operation refers to a device and/or machine that is physically constructed and arranged to perform the specified operation. Hence, each apparatus 14, 18 or 36 is a network-enabled machine implementing network communications via the network loop-free routing topology 10.

Each apparatus 14, 18 or 36 can include a device interface circuit 30, a processor circuit 32, and a memory circuit 34. The device interface circuit 30 can include one or more distinct physical layer transceivers for communication with any one of the other devices 18; the device interface circuit 30 also can include an IEEE based Ethernet transceiver for communications with the devices of FIG. 1 via any of the links 22 and/or 24 (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 14, 18 or 36 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), and/or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit (s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4A:
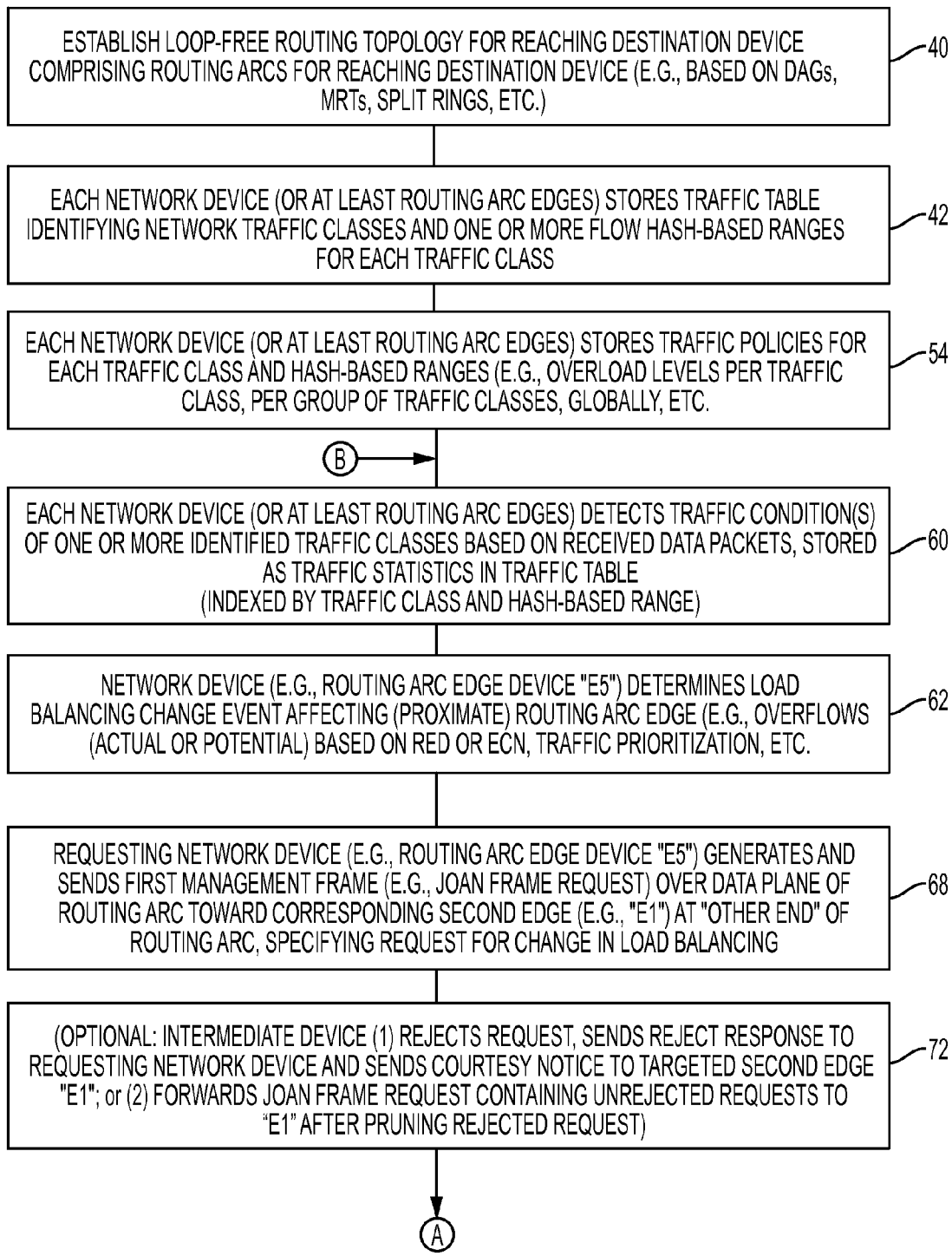
FIGS. 4A and 4B summarize an example method of exchanging data plane management frames for load balancing of identified traffic classes in the loop-free routing topology of FIG. 1, according to an example embodiment.
Figure 4B:
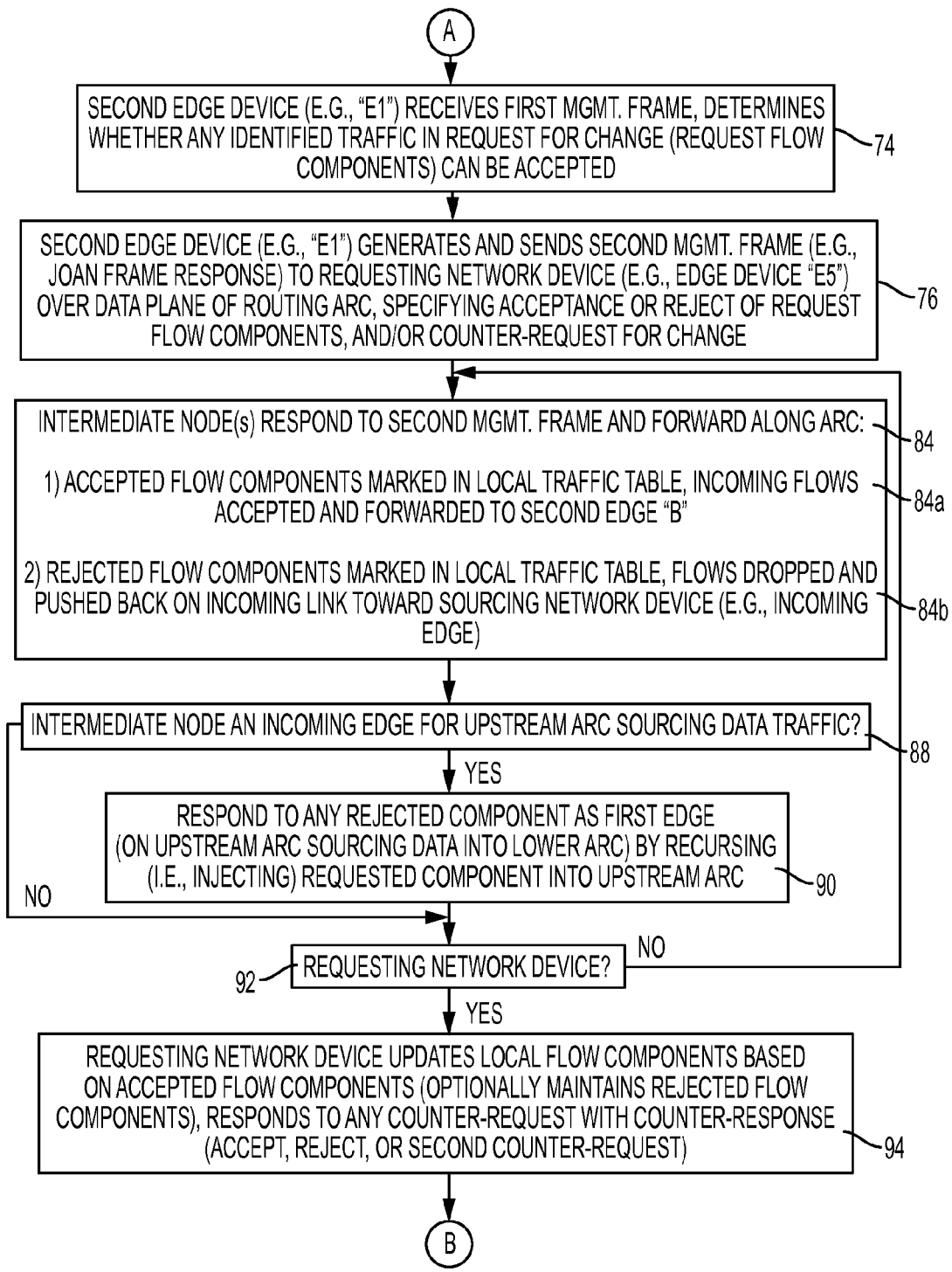

FIGS. 4A and 4B summarize an example method of exchanging data plane management frames for load balancing of identified traffic classes in the loop-free routing topology of FIG. 1, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 4A, the network controller 36 in operation 40 can create a loop-free routing topology 10 for each network device 18 in the data network; in other words, the creation of a loop-free routing topology 10 in operation 40 by the network controller 36 can be repeated for each network device 18 in the data network. The loop-free routing topology 10 comprising routing arcs 12 can be created by the processor circuit 32 of the network controller 36 based on various techniques, for example as described in U.S. Patent Publication No. 2012/0300668, U.S. Pat. No. 8,897,135, etc., for example based on directed acyclic graphs, MRTs, etc. The network controller 36 also can construct a loop-free routing topology 10 based on split-ring topologies as described for example in U.S. Patent Publication No. U.S. Patent Publication No. 2014/0078927.

The network controller 36 in operation 40 can at least initially establish the loop-free routing topology 10 and provide high-level control of the loop-free routing topology 10 based on sending control plane Operations, Administration, and Maintenance (OAM) messages to each of the network devices 18 in the data network.

As illustrated in the U.S. Patent Publication No. 2012/0300668, a loop-free routing topology 10 can be created in operation 40 based the network controller 36 attempting to establish every network node, except the root network node and the heir network nodes, as junction nodes, in order to guarantee that every network node has a shortest path and an alternate path to a destination device (i.e., the root network node) 14. This guarantee is established by creating routing arcs 12 that terminate at safe network nodes. Since conventional techniques for generating a directed acyclic graph (DAG) do not guarantee that every node within a directed acyclic graph can be a junction, the example embodiments enable a link to be reversed in response to a detected failure in a network node or network link, enabling immediate rerouting of data traffic without route recalculation and without the formation of any loops in the topology.

Hence, the network controller 36 in operation 40 can establish a loop-free routing topology of routing arcs for reaching a root network node, the loop-free routing topology consisting of a root network node, two or more heir network nodes coupled to the root network node, junction nodes, and zero or more leaf network nodes. Leaf network nodes are not shown in the attached Figures to reduce unnecessary complexity in the figures; hence, leaf network nodes can be attached to network devices 18 of the loop-free routing topology 10 even though not shown in the Figures.

The loop-free routing topology 10 can be created by the network controller 36 in operation 40 based on: generating a first directed acyclic graph for reaching the destination device 14; identifying (within the first directed acyclic graph) junction nodes that have non-congruent paths for reaching the destination device 14; identifying links between the junction nodes that can be bidirectional links 22, or reversed if needed ("reversible links"), along the non-congruent paths, and that do not introduce or create a loop in the loop-free routing topology 10; and identifying at least one second directed acyclic graph within the first directed acyclic graph (also referred to as a "subDAG") for reaching one of the junction nodes, the second directed acyclic graph including an identified new junction node having a new non-congruent path for reaching the destination device.

The network controller 36 in operation 40 can construct a first of the infrastructure arcs (e.g., 12a and/or 12b) comprising two or more of the junction nodes and one or more bidirectional links 22, the first of the infrastructure arcs having the corresponding first end terminating at the destination device; the network controller 36 also can construct a second of the routing arcs (e.g., 12c, 12d, and/or 12e) can be after the first of the routing arcs (e.g., 12a and/or 12b) and having the corresponding first end 20 terminating at the first of the routing arcs. Hence, the loop-free routing topology 10 has a plurality of the routing arcs 12 and can consist of the destination device 14, zero or more leaf nodes each having only one data link, and the plurality of junction nodes (e.g., edge junctions "B2" or "E4", edge nodes "E1" or "E5", collapsed-arc center junction nodes "F1", or intermediate junctions "E2", "E3", or "E4"). Other techniques for constructing the loop-free routing topology 10 can be used.

The network controller 36 in operation 42 can send to each network device 18 an OAM message (in the control plane) specifying parameters for storing a traffic table (44 of FIGS. 3 and 6A) that can identify one or more traffic classes (46 of FIG. 6A-6F) and can identify one or more hash-based ranges (48 of FIG. 6A-F) for each of the identified traffic class (e.g., 46a, 46b, 46c, 46d, 46e, or 46f). The number of identified traffic classes 46 can be chosen by the network controller 36 to optimize the "granularity" (i.e., precision) required to distinguish between different traffic flows for a given identified traffic class 46.

Figure 6A:
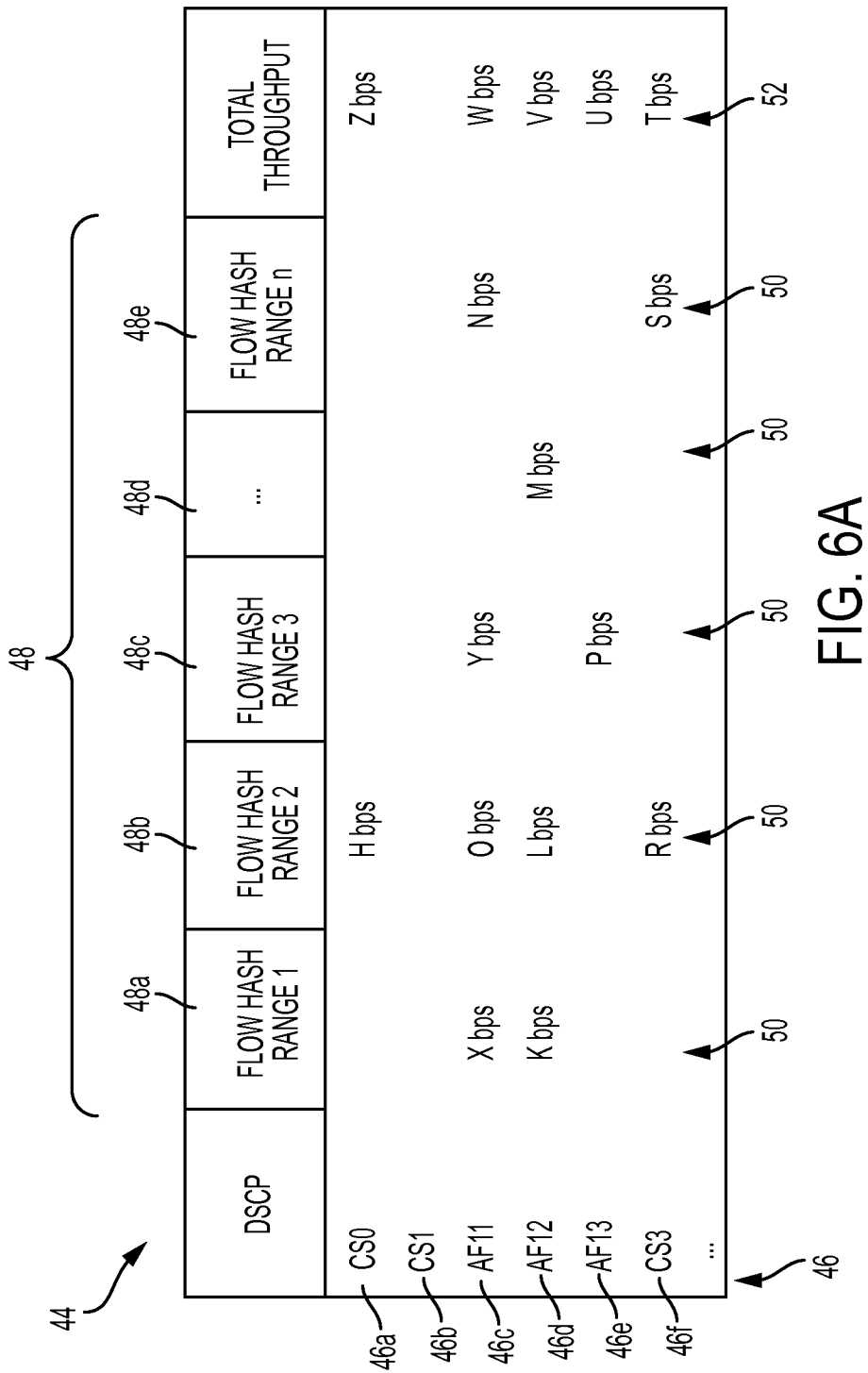

As illustrated in FIG. 6A, the memory circuit 34 of each network device 18 in operation 42 can store in its memory circuit 34 the traffic table 44 that comprises a range-specific traffic value 50 for a corresponding identified traffic class 46 and hash-based range 48, and a class-based traffic value 52 that aggregates all the range-specific traffic values 50 for all the hash-based ranges 48 of a given identified traffic class 46. Other techniques can be used for storing the traffic table 44. Each identified traffic class 46 can be identified based on various attributes for identification of network traffic (e.g., network "flows"), for example as Differentiated Services ("DiffServ") based on class selector (CS) code point (e.g., 46a, 46b, and/or 46f), assured forwarding (AF) class (e.g., 46c, 46d, and/or 46e), etc. Other techniques for identifying traffic can be used, for example according to RFC 7011. Each hash-based range 48 can be generated using various techniques, for example according to RFC 7014.

The processor circuit 32 of each network device 18 is configured for storing in operation 54 traffic policies for each identified traffic class 46 and hash-based ranges 48 in a traffic policy table 56 stored in the memory circuit 34. The traffic policy table 56 can specify, for each hash-based range 48 of an identified traffic class 46, one or more traffic policies associated with the corresponding hash-based range 48 of the identified traffic class 46. Example traffic policies can include QoS priority values, guaranteed QoS parameters, minimum (or maximum) guaranteed bandwidth values (e.g., bits per second (bps)), jitter values, etc. The traffic policies can be supplied by an OAM message from the network controller 36; other techniques can be used by the network device 18 for storing the traffic policies in the traffic policy table 56.

The processor circuit 32 of each network device 18 (or at least the routing arc edges (e.g., E1, E5) can detect traffic conditions in operation 60 for one or more identified traffic classes 46 based on received data packets that are received by the corresponding device interface circuit 30. The processor circuit 32 can identify the identified traffic class 46 and hash-based range 48 of each received data packet, for example based on executing traffic classification, or by parsing a label specifying the identified traffic class 46 and hash-based range 48 (which can be added by an ingress network device in the data network). The processor circuit 32 of the network device 18 (e.g., "E5") receiving a data packet can store or update in operation 60 the appropriate range-specific traffic value 50, illustrated for example in FIG. 6A as a certain value of bits per second (bps).

Figure 5A:
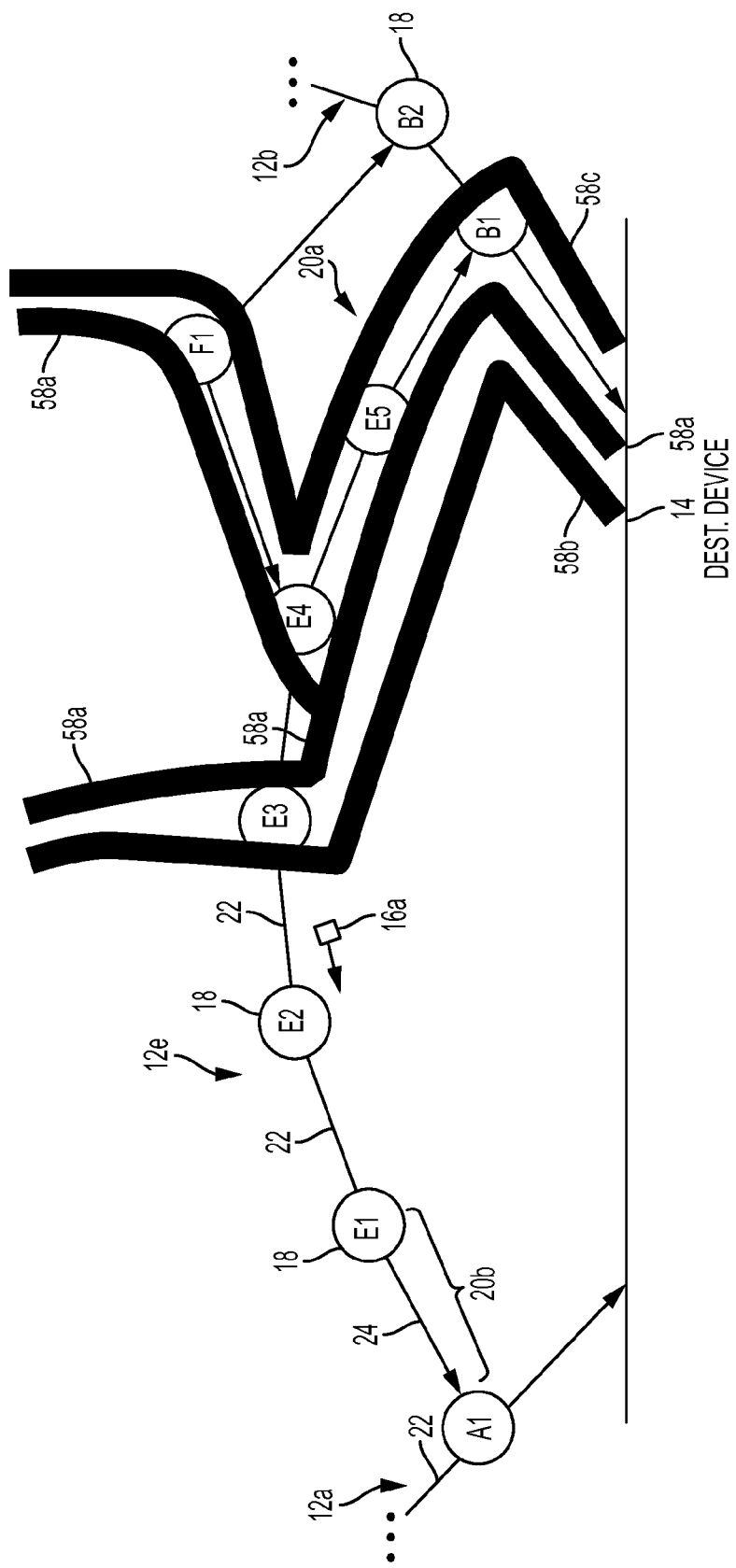
FIGS. 5A-5C illustrate load balancing identified traffic classes in the example routing arc of FIG. 2 based on exchange of data plane management frames, according to an example embodiment.

FIG. 5A illustrates the generation and output of the data-plane management frame 16a by the network device "E5" 18 based one or more detected traffic conditions caused by one or more example identified flows of data packets 58a, 58b, and 58c propagated in the routing arc 12e, according to an example embodiment. The identified flow 58a is identified in the traffic table 44 of the network device "E5" as belonging to the hash-based range "Flow Hash range 2" 48b within the identified traffic class "CS0" 46a; the identified flow 58b is identified in the traffic table 44 of the network device "E5" as belonging to the hash-based range "Flow Hash range 1" 48a within the identified traffic class "AF11" 46c; and the identified flow 58c is identified in the traffic table 44 of the network device "E5" as belonging to the hash-based range "Flow Hash range 3" 48c within the identified traffic class "AF11" 46c. The identified flow 58a enters the routing arc 12e via the edge link 24 into the network device "E3" 18, and via the edge link 24 entering into the network device "F1" 18 of the collapsed routing arc 12f which forwards the identified flow 58a to the edge junction "E4" 18. The identified flow 58b enters the routing arc 12e via the edge link 24 into the network device "E3" 18. The identified flow 58c enters the routing arc 12e via the edge link 24 entering into the network device "F1" 18 of the collapsed routing arc 12f which forwards the identified flow 58a to the edge junction "E4" 18. Hence, the edge junction "E4" 18 forwards the identified flows 58a, 58b, and 58c to the next-hop edge node "E5" 18.

In response to the device interface circuit 30 of the edge node "E5" 18 receiving in operation 60 each of the identified flows 58a, 58b, and 58c, the processor circuit 32 (e.g., a forwarding ASIC in the network device 18) can update the respective range-specific traffic values 50 in the traffic table 44 stored in the memory circuit 34 of the edge node "E5". The range-specific traffic values 50 can be stored as traffic statistics, etc. indexed by the traffic class 46 and hash-based range 48.

The processor circuit 32 of the edge node "E5" 18 can determine or detect in operation 62 whether there is a load balancing change event that affects the proximate (i.e., nearest) routing arc edge 20a, for example that affects the edge node "E5" itself or that affects the adjacent edge link 24 that supplies data traffic from the edge node E5" 18 to the network device "B1" 18. For example, the processor circuit 32 of the edge node "E5" 18 can detect a load balancing change event based on whether any one of the range-specific traffic values 50 exceeds a corresponding policy value specified in the traffic policy table 56 (e.g., due to burst traffic or an identification of higher-priority data traffic or data traffic requiring a higher QoS). The processor circuit 32 of the edge node "E5" 18 also can detect a load balancing change event based actual or potential overflows, for example based on DSCP-based detection such as random early detection (RED) and/or explicit congestion notification (ECN) relative to policies stored in the traffic policy table 56. As one example, a policy stored in the traffic policy table 56 can identify overload levels based on DSCP classification, for example per hash-based range 48 of a class-based traffic value 52, per a group of hash-based ranges 48 for identified traffic class 46, for an entire identified traffic class 46, and/or for a global aggregate value for aggregate traffic output by the network device 18. The processor circuit 32 of the edge node "E5" 18 also can detect a load balancing change event based on a deteriorated condition in the edge link 24, for example due to a degraded wireless data link due to radio frequency (RF) interference, etc.

The load balancing change event detection in operation 62 by the processor circuit 32 of the edge node "E5" 18 can be based on rules stored in the traffic policy table 56 and associated with the policies for each of the identified traffic classes 46, each of the hash-based ranges 48 or group thereof for an identified traffic class 46, etc. The rules stored in the traffic policy table 56 can indicate relative priorities or precedence for selection of data flows that should be marked as "overflow", e.g., DSCPs that can be rerouted; for example, whether an assured forwarding class (AF) due to a large amount of traffic, or whether a CS class should be rerouted during instances of low traffic.

Figure 6B:
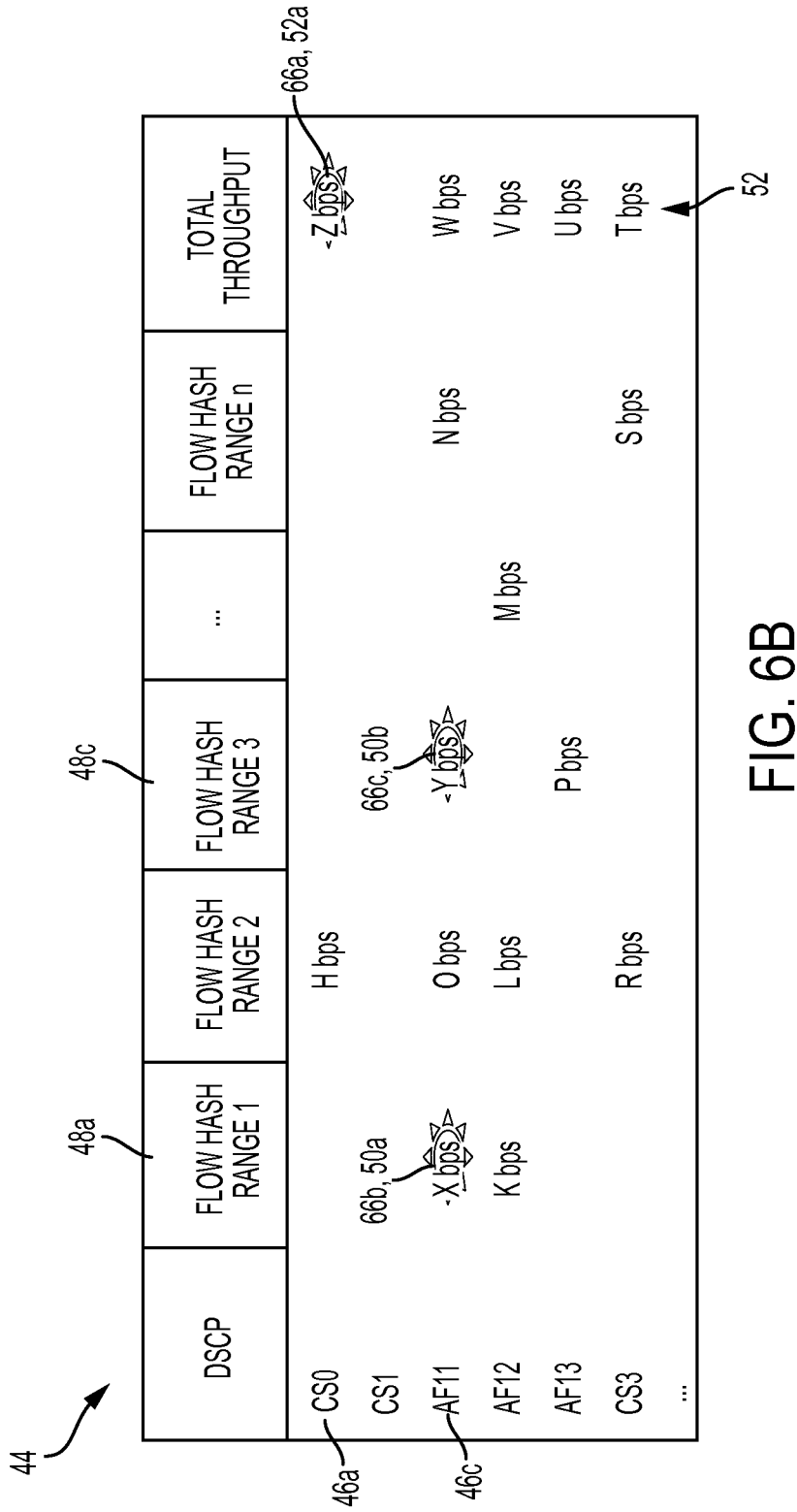

For example, the processor circuit 32 of the edge node "E5" 18 can determine or detect in operation 62 with respect to the traffic policy table 56: the load balancing change event 66a in FIG. 6B with respect to the class-based traffic value "Z bps" 52a for the identified traffic class "CS0" 46 of the identified flow 58a of FIG. 5A; the load balancing change event 66b in FIG. 6B with respect to the range-specific traffic value "X bps" 50a for the identified flow 58b; and the load balancing change event 66c in FIG. 6B with respect to the range-specific traffic value "Y bps" 50b for the identified flow 58c. In other words, the processor circuit 32 of the edge node "E5" 18 can determine in operation 62 that it wishes to reroute the associated identified flows 58a, 58b, and 58c away from the "proximate" edge 20a (e.g., away from itself and/or the connecting edge link 24) and toward a "second" edge 20b.

The processor circuit 32 can determine in operation 62 whether there is a load balancing change event on a periodic basis and/or a triggered event.

In response to determining one or more load balancing change events 66 the processor circuit 32 of the edge node "E5" 18 in operation 68 can generate and send a data-plane management frame 16a, implemented for example as a JOAN frame, specifying one or more requests for changes in load balancing (e.g., 70a, 70b, and/or 70c of FIG. 6C) for rerouting the identified traffic classes from the edge 20a toward the edge 20b. The data-plane management frame 16a also can be referred to as a load balancing request message.

Figure 5B:
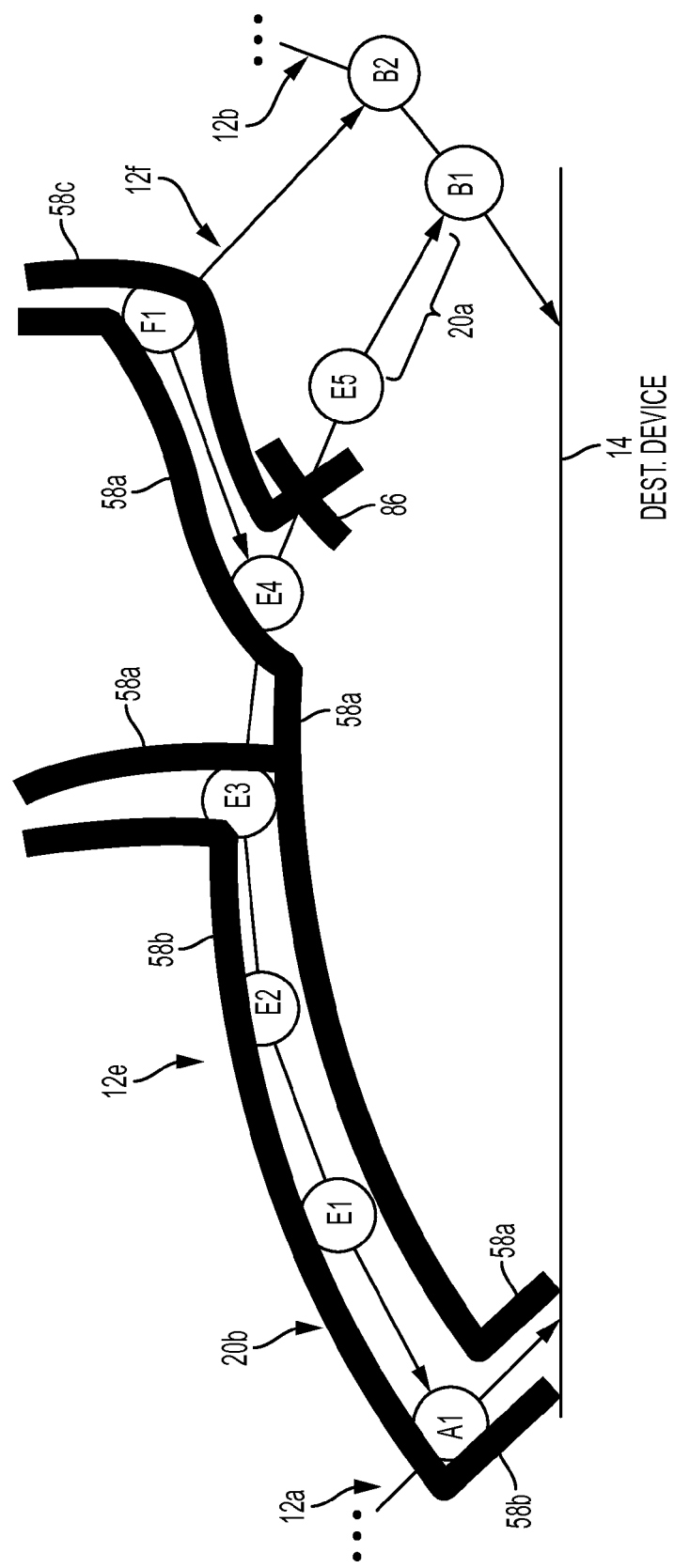
Figure 5C:
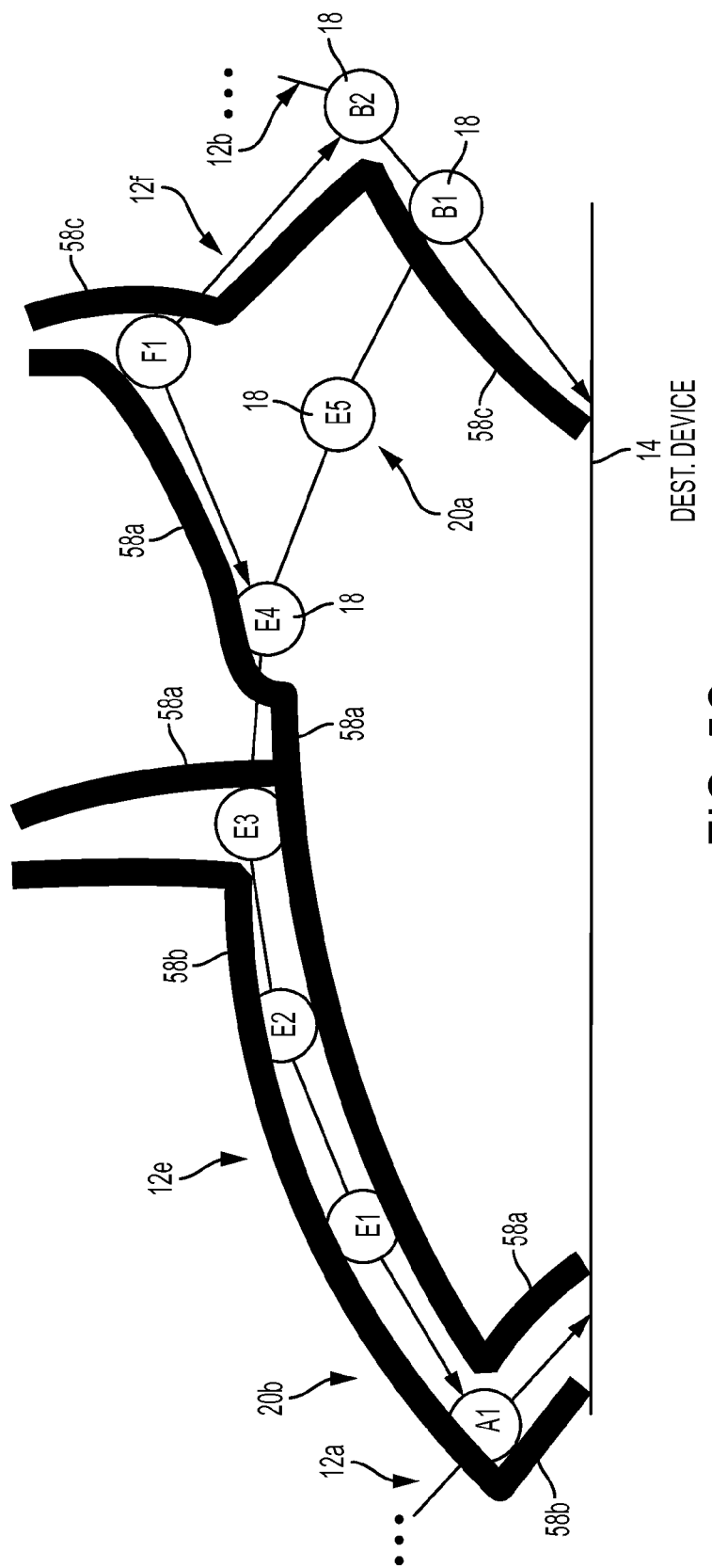
Figure 6C:
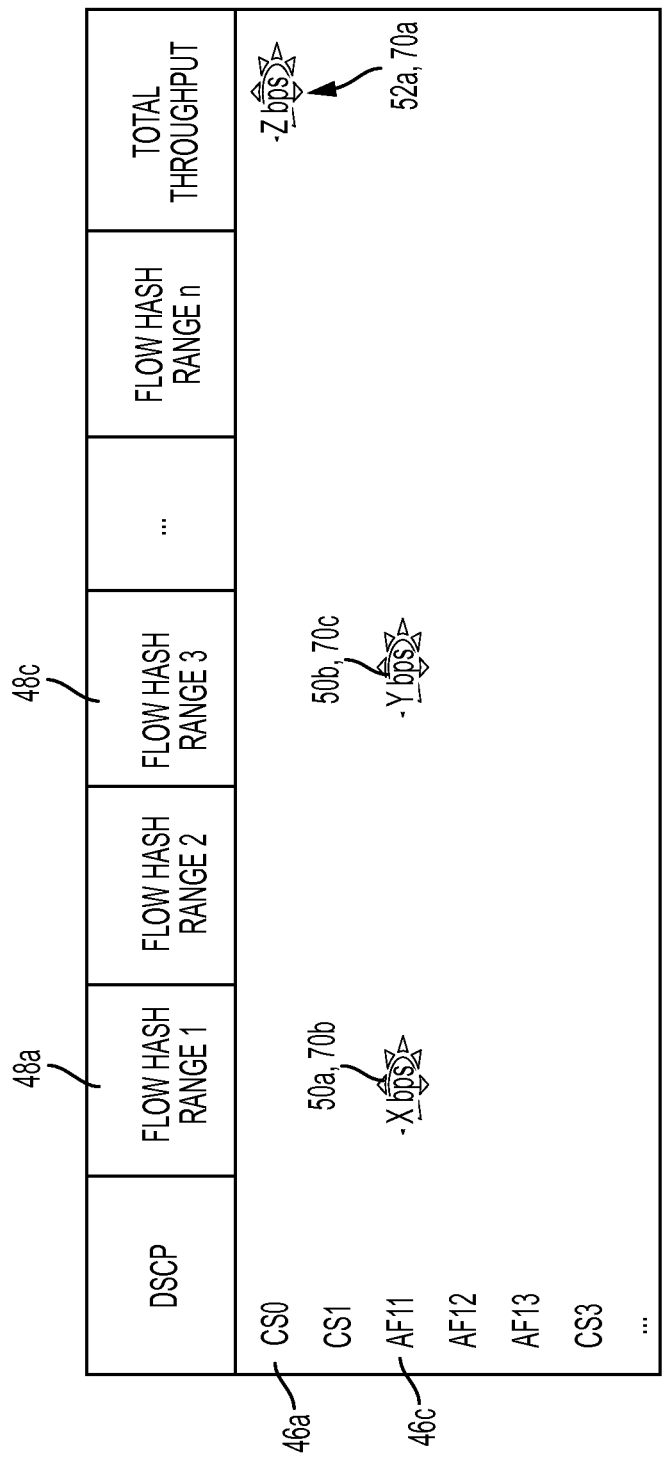

FIG. 6C illustrates specifies change requests 70a, 70b, and 70c that are generated by the processor circuit 32 of the requesting edge node "E5" 18 with respect to the respective load balancing change events 66a, 66b, and 66c, for insertion into the data-plane management frame 16a. In particular, the processor circuit 32 of the requesting edge node "E5" 18 can specify within the data-plane management frame 16a the change request 70a for rerouting all traffic flows (58a of FIGS. 5A-5C) from the edge 20a (as in FIG. 5A) toward the edge 20b (as in FIGS. 5B and 5C) for the identified traffic class "CS0" 46a (having a class-based traffic value 52a of "Z bps"); the processor circuit 32 of the requesting edge node "E5" also can specify within the data-plane management frame 16a the change request 70b for rerouting, from the edge 20a toward the edge 20b, the traffic flow (58b of FIG. 5A) associated with the hash-based range "Flow Hash Range 1" 48a having the range-specific traffic value "X bps" 50a for the identified traffic class "AF11" 46c; the processor circuit 32 of the edge node "E5" also can specify within the data-plane management frame 16a the change request 70c for rerouting, from the edge 20a toward the edge 20b, the traffic flow associated with the hash-based range "Flow Hash Range 3" 48c having the range-specific traffic value "Y bps" 50b for the identified traffic class "AF11" 46c. As illustrated in FIG. 6C, each change request 70 can specify the traffic limit expected as part of the change request, e.g., "Z bps" 52a for the change request 70a, "X bps" 50a for the change request 70b, and "Y bps" 50b for the change request 70c.

The data-plane management frame 16a need not necessarily have the format as illustrated in FIG. 6C, but can at least identify the change requests 70 and a target address for the second edge node "E1" 18 serving the second edge 20b. The device interface circuit 30 of the requesting edge node "E5" 18 is configured for sending or outputting in operation 68 the data-plane management frame 16a via the data plane path 26a of the routing arc 12e toward the edge 20b (illustrated in FIG. 2), for initiating of the load balancing based on negotiation with the edge node "E1" 18. Additional details with respect to JOAN frames can be found in U.S. Publication No. 2015/0163091.

As illustrated in FIG. 2 and operation 72 of FIG. 4A, the processor circuit 32 of each intermediate network device (e.g., "E4", "E3", and "E2") 18 in the data plane path 26a can receive, parse and interpret the data-plane management frame 16a prior to forwarding the data-plane management frame 16a along the data plane path 26a. Each intermediate network device in the data plane path 26a can compare each of the change requests (e.g., 70a, 70b, and 70c) specified in the received data-plane management frame 16a with its traffic table 44 and traffic policy table 56 to determine whether it can accept the change requests 70. For example, if the processor circuit 32 of the network device "E2" 18 determines that it cannot accept (and must reject) one or more of the change requests (e.g., 70c) (referred to as an intermediate-rejected change request), the processor circuit 32 of the network device "E2" 18 in response can send a reject response (e.g., as a JOAN frame) back to the requesting edge node "E5" 18 having originated the data-plane management frame 16a indicating at least rejection of the intermediate-rejected change request.

In one example embodiment, the intermediate network device (e.g., "E2") 18 that is "upstream" of the target edge device "E1"18 can drop the data-plane management frame 16 and respond to the requesting network device "E5" 18 if the intermediate network device 18 cannot accept one or more of the change requests (e.g., 70c) (i.e., one or more intermediate-rejected change requests); the intermediate network device 18 also can send a "courtesy" notice message (e.g., as a JOAN frame) to the target edge device "E1" indicating that the data-plane management frame 16a was rejected.

In an alternate example embodiment, the processor circuit 32 of the intermediate network device (e.g., "E2") 18 having rejected the one or more intermediate-rejected change requests (e.g., 70c) can forward toward the edge device "E1" 18 a modified data-plane management frame 16 that includes the non-rejected change requests (e.g., 70a, 70b) and that does not include the intermediate-rejected change request (e.g., 70c) that was rejected by the intermediate network device (e.g., "E2"). If preferred, the intermediate network device (e.g., "E2") can respond to the intermediate-rejected change request (e.g., 70c) by sending a reject response back to the requesting edge node "E5" specifying the rejection of the intermediate-rejected change request (e.g., 70c). As described in further detail below, the reject response also can specify a counter-request generated by the intermediate network device (e.g., "E2").

Referring to FIG. 4B, device interface circuit 30 of the second edge "E1"18 in operation 74 can receive the data-plane management frame 16*a* from the data plane path 26*a*. The processor circuit 32 of the second edge device "E1"18 in operation 74 can determine whether any identified traffic in the change requests 70 specified in the data-plane management frame 16*a* can be accepted, based on comparing the change requests 70 with the current traffic flows identified in its traffic table 44 (e.g., the range-specific traffic values 50 and the class-based traffic values 52) relative to the policies in its traffic policy table 56. In response to determining whether any of the change requests 70 can be accepted, the processor circuit 32 of the second edge device "E1" 18 in operation 76 can generate and send a second data-plane management frame 16*b* toward the requesting edge device "E5" 18 via the data plane path 26*b*.

Figure 6D:
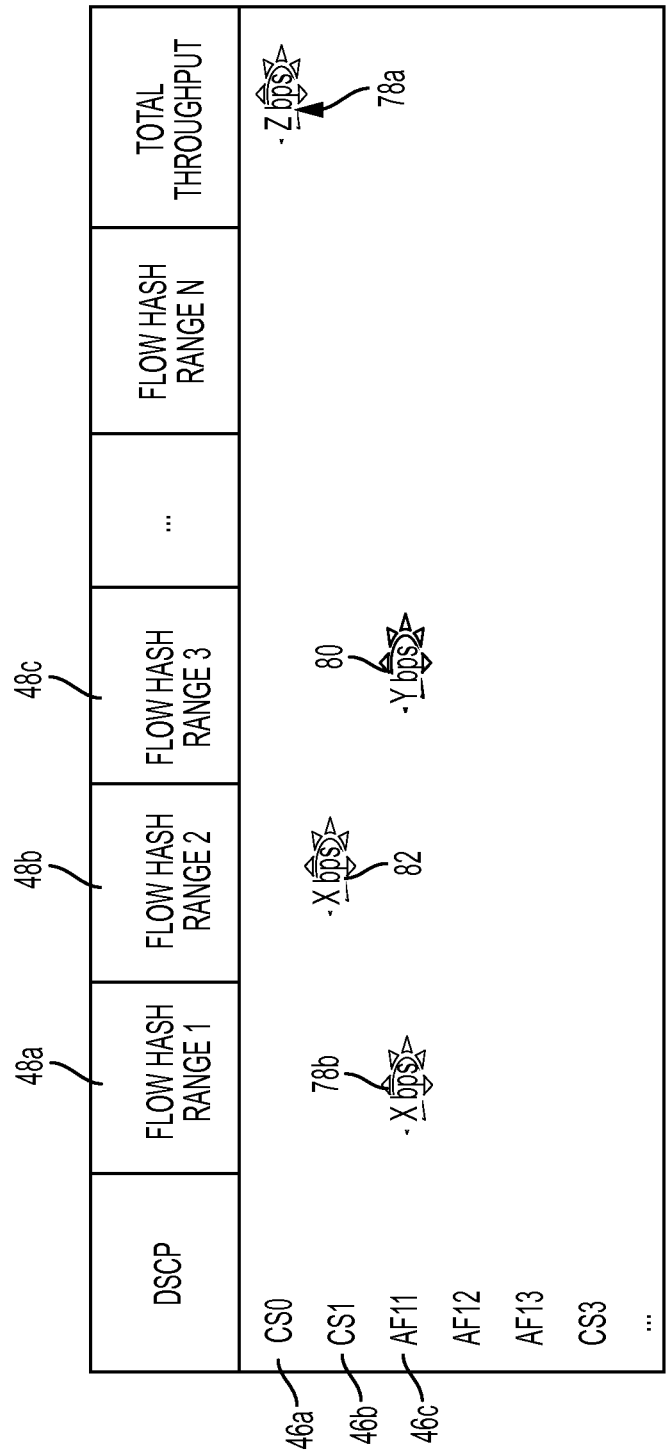

As illustrated in FIG. 6D, the processor circuit 32 of the second edge device "E1" 18 in operation 76 can determine and generate at least one of an acceptance 78, a rejection 80, or a counter-request 82 associated with one or more of the change requests 70 specified in the data-plane management frame 16*a*. For example, the data-plane management frame 16*b* generated by the processor circuit 32 of the second edge device "E1" can specify the acceptance 78*a* relative to the change request 70*a*, the acceptance 78*b* relative to the change request 70*b*, and a rejection 80 relative to the change request 70*c*. The processor circuit 32 of the second edge device "E1" also can generate a new request, referred to as a "counter-request" 82, that can be either responsive to the data-plane management frame 16*a* or independent of the data-plane management frame 16*a*. Hence, the data-plane management frame 16*b* output by the device interface circuit 30 of the second edge device "E1" 18 via the data plane path 26*b* for delivery to the requesting network device "E5" can specify the acceptances 78*a* and 78*b*, the rejection 80, and/or the counter-request 82.

The processor circuit 32 of the second edge device "E1" 18 in operation 76 also can update its forwarding table (84 of FIG. 3) to specify that the identified flow 58*a* associated with the acceptance 78*a*, and the identified flow 58*b* associated with the acceptance 78*b* should be forwarded to the next-hop node "A1" 18 via the edge link 24 (as illustrated in FIG. 5B) (e.g., change forwarding table entry from "right" to "left"), and that flows associated with the counter-request 82 should be dropped and pushed back on the incoming link (e.g., intra-arc link 22 between network devices "E1" and "E2").

The intermediate network devices "E2", "E3", and "E4" along the data plane path 26*b* also can respond in operation 84 to the second data-plane management frame 16*b* based on the acceptance 78*a*, the acceptance 78*b*, and the rejection 80, prior to forwarding the data-plane management frame 16*b* toward the requesting edge device "E5" 18. For example, the processor circuit 32 of the intermediate network device "E3" can implement in operation 84*a* the acceptance 78*a* and the acceptance 78*b* based on updating the respective forwarding table entries in its forwarding table 84 to specify that the respective associated flows 58*a* and 58*b* should be forwarded toward the edge 20*b* (e.g., via the edge device "E1" or "left"), illustrated in FIG. 5B. For example, the memory circuit 34 of each intermediate network device "E2", "E3", and "E4" 18 can specify that the forwarding table entry in the forwarding table 84 for the identified flow 58*a* should be changed from "right" (toward the edge 20*a*) to "left" (toward the edge 20*b*), enabling each of the intermediate network devices "E2", "E3", and "E4" to redirect/reroute the identified flow 58*a* and the identified flow 58*b* away from the edge 20*a* and toward the edge 20*b* as in FIG. 5B.

The memory circuit 34 of each intermediate network device "E2", "E3" and "E4" 18 in operation 84*b* also can implement the rejection 80 based on updating the forwarding table entry in its forwarding table 84 to specify that the identified flow 58*c* should be dropped (illustrated as blockage 86 of FIG. 5B), and pushed back onto the incoming link toward the sourcing network device, described below.

Assuming in operation 88 that there are no intermediate nodes that serve as an incoming edge for an upstream arc sourcing the data traffic, the data-plane management frame 16*b* is forwarded toward the requesting network device "E5" 18. In response to the requesting network device "E5" 18 receiving in operation 92 the data-plane management frame 16*b*, the processor circuit 32 of the requesting network device "E5" 18 in operation 94 updates the local flow components in its forwarding table 84, for example specifying that the flows 58*a* and 59*b* are to be sent "left" toward the edge 20*b*, and depending on implementation that the identified flow 58*c* is either maintained (e.g., to the "right" toward edge 20) or dropped (based on the rejection 80). The processor circuit 32 of the requesting network device "E5" 18 in operation 94 also can respond to the counter-request 82 with a counter-response, for example another acceptance 78, a rejection 80, or another counter-request 82.

As illustrated in FIGS. 4B and 5B with respect to operation 88, the edge junction "E4" 18 is an incoming edge for the upstream arc 12*f* sourcing the identified flow 58*c* (received by the network device "F1" via the edge link 24 of FIG. 2). Hence, the processor circuit 32 of the edge junction "E4" 18 in operation 90 can respond to the rejection 80 by generating its own data-plane management frame 16*c* (shown in FIG. 2) specifying the change request 70*c*, and outputting the data-plane management frame 16*c* toward the distant junction node "B2" 18 via the data plane path 26*c*. Hence, the processor circuit 32 of the edge junction "E4" 18 can treat the rejection 80 as a new load balancing change event in operations 62, 68 and "recurse" or "propagate" the rejected change request 70*c* as a new change request 70*c'* (illustrated in FIG. 6E) into the upstream arc 12*f* toward the source of the identified flow 58*c*, to enable searching for an alternative route for the identified flow 58*c*. The edge junction "B2" 18 can respond to the data-plane management frame 16*c* based on generating and output a data-plane management frame 16*d* (operations 74, 76) via the data plane path 26*d*. Assuming the data-plane management frame 16*d* specifies an acceptance (78*c* of FIG. 6F) that the edge device "B2" 18 accepted the change request 70*c'*, the network device "F1" can redirect/reroute the identified flow 58*c* based on updating its forwarding table 84 to specify that the identified flow 58*c* should be sent "right" to the network device "B2" 18; the edge junction "E4" 18 can update its forwarding table 84 to remove the blockage 86 and specify that any receipt of the identified flow 58*c* should be "pushed back" toward the network device "F1" for rerouting by the network device "F1" toward the network device "B2" of routing arc 12*b*, as illustrated in FIG. 5C.

According to example embodiments, class-aware load balancing can be implemented using a data-plane protocol in a loop-free multiple edge network topology, without the necessary of transferring any arc cursor that otherwise claims exclusive authority for routing network traffic in a routing arc. The loop-free routing topology can be constructed using various techniques, for example based on directed acyclic graphs (DAGs), outer paths of MRTs (also referred to as "ears"), etc. Management frames can be forwarded between network devices in the data-plane protocol, enabling network devices to negotiate load-balancing decisions for rerouting of network traffic according to identified traffic classes based on identified policies, without the intervention of a network manager operating or network controller on a control plane.

Although the example embodiments illustrated initiating of load balancing by an edge device, the load balancing as described herein can be initiated by any network device in the loop-free routing topology that is not a leaf node.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting a traffic condition by a network device in a loop-free routing topology comprising routing arcs for reaching a destination device, each routing arc comprising a first edge, a second edge, and at least a third network device configured for routing any network traffic along the routing arc toward the destination device and exiting via any one of the first or second edges of the routing arc, the traffic condition proximate to the first edge of at least one of the routing arcs in which the network device is positioned; and
   the network device initiating load balancing based on sending a management frame over a data plane of the at least one routing arc toward the corresponding second edge, the management frame requesting a change in load balancing for at least one of an identified traffic class based on the detected traffic condition;
   wherein the management frame specifies the change in load balancing for one or more identified hash-based ranges of the identified traffic class according to a corresponding one or more traffic parameter.

2. The method of claim 1, wherein the network device is a junction node between the first edge of the at least one routing arc and a second routing arc downstream of the at least one routing arc, the detected traffic condition based on receiving, in the second routing arc, a second management frame rejecting a second change in load balancing in the second routing arc.

3. The method of claim 2, wherein the change in load balancing for the at least one identified traffic class is based on the second change rejected in the second management frame specifying the identified traffic class.

4. The method of claim 3, wherein the change in load balancing further specifies a traffic limit for one or more of the hash-based ranges for the at least one identified traffic class.

5. The method of claim 2, further comprising redirecting a second identified traffic class from the first edge of the second routing arc to the second edge of the second routing arc in response to the second management frame accepting a third change in load balancing the second identified traffic class in the second routing arc.

6. The method of claim 1, further comprising:
   storing in the network device a traffic table specifying a plurality of identified traffic classes of the network traffic, and a plurality of the hash-based ranges for each of the identified traffic classes; and
   updating an entry in the traffic table based on classifying the network traffic received by the network device into one of the hash-based ranges of one of the identified traffic classes, and updating the corresponding entry in the traffic table associated with the one hash-based range for the one identified traffic class with a traffic value;
   the detecting of the traffic condition based on a comparison of the traffic value with a corresponding traffic policy associated with the one hash-based range for the one identified traffic class with a traffic value.

7. The method of claim 1, further comprising at least one second network device, along the at least one routing arc between the network device and the corresponding second edge, responding to the management frame based on outputting to the network device a response specifying whether the change in load balancing can be executed to reduce traffic in the network device, independent of any corresponding arc cursor of the at least one routing arc.

8. The method of claim 1, further comprising at least one second network device, along the at least one routing arc between the network device and the corresponding second edge, accepting and implementing the change based on redirecting the identified traffic class toward the corresponding second edge, independent of any corresponding arc cursor of the at least one routing arc.

9. An apparatus comprising:
   a processor circuit configured for detecting a traffic condition in a loop-free routing topology comprising routing arcs for reaching a destination device, each routing arc comprising a first edge, a second edge, and at least a third network device configured for routing any network traffic along the routing arc toward the destination device and exiting via any one of the first or second edges of the routing arc, the traffic condition proximate to the first edge of at least one of the routing arcs in which the apparatus is positioned as a network device, the processor circuit further configured for initiating load balancing based on generating a management frame requesting a change in load balancing for at least one of an identified traffic class based on the detected traffic condition; and
   a device interface circuit configured for sending the management frame over a data plane of the at least one routing arc toward the corresponding second edge, for initiating of the load balancing;
   wherein the processor circuit is configured for specifying, within the management frame, the change in load balancing for one or more identified hash-based ranges of the identified traffic class according to a corresponding one or more traffic parameter.

10. The apparatus of claim 9, wherein the apparatus is a junction node between the first edge of the at least one routing arc and a second routing arc downstream of the at least one routing arc, the processor circuit configured for detecting the detected traffic condition based on receiving, in the second routing arc, a second management frame rejecting a second change in load balancing in the second routing arc.

11. The apparatus of claim 10, wherein the processor circuit is configured for requesting the change in load balancing for the at least one identified traffic class is based on the second change rejected in the second management frame specifying the identified traffic class.

12. The apparatus of claim 11, wherein the processor circuit is configured for specifying in the change in load balancing a traffic limit for one or more of the hash-based ranges for the at least one identified traffic class.

13. The apparatus of claim 10, wherein the processor circuit is configured for redirecting a second identified traffic class from the first edge of the second routing arc to the second edge of the second routing arc in response to the second management frame accepting a third change in load balancing the second identified traffic class in the second routing arc.

14. The apparatus of claim 9, wherein:
the apparatus further comprises a memory circuit configured for storing a traffic table specifying a plurality of identified traffic classes of the network traffic, and a plurality of the hash-based ranges for each of the identified traffic classes;
the processor circuit further configured for updating an entry in the traffic table based on classifying the network traffic received by the network device into one of the hash-based ranges of one of the identified traffic classes, the processor circuit configured for updating the corresponding entry in the traffic table associated with the one hash-based range for the one identified traffic class with a traffic value;
the processor circuit configured for detecting the traffic condition based on a comparison of the traffic value with a corresponding traffic policy associated with the one hash-based range for the one identified traffic class with a traffic value.

15. The apparatus of claim 9, wherein the management frame causes at least one second network device, along the at least one routing arc between the network device and the corresponding second edge, to respond whether the change in load balancing can be executed to reduce traffic in the network device, independent of any corresponding arc cursor of the at least one routing arc.

16. The apparatus of claim 9, wherein the management frame causes at least one second network device, along the at least one routing arc between the network device and the corresponding second edge, to accept and implement the change based on redirecting the identified traffic class toward the corresponding second edge, independent of any corresponding arc cursor of the at least one routing arc.

17. One or more non-transitory tangible media encoded with logic for execution by a machine and when executed by the machine operable for:
detecting a traffic condition by the machine implemented as a network device in a loop-free routing topology comprising routing arcs for reaching a destination device, each routing arc comprising a first edge, a second edge, and at least a third network device configured for routing any network traffic along the routing arc toward the destination device and exiting via any one of the first or second edges of the routing arc, the traffic condition proximate to the first edge of at least one of the routing arcs in which the network device is positioned; and
the network device initiating load balancing based on sending a management frame over a data plane of the at least one routing arc toward the corresponding second edge, the management frame requesting a change in load balancing for at least one of an identified traffic class based on the detected traffic condition;
wherein the management frame specifies the change in load balancing for one or more identified hash-based ranges of the identified traffic class according to a corresponding one or more traffic parameter.

18. The one or more non-transitory tangible media of claim 17, wherein the network device is a junction node between the first edge of the at least one routing arc and a second routing arc downstream of the at least one routing arc, the detected traffic condition based on receiving, in the second routing arc, a second management frame rejecting a second change in load balancing in the second routing arc.

19. The one or more non-transitory tangible media of claim 17, further operable for:
storing in the network device a traffic table specifying a plurality of identified traffic classes of the network traffic, and a plurality of the hash-based ranges for each of the identified traffic classes; and
updating an entry in the traffic table based on classifying the network traffic received by the network device into one of the hash-based ranges of one of the identified traffic classes, and updating the corresponding entry in the traffic table associated with the one hash-based range for the one identified traffic class with a traffic value;
the detecting of the traffic condition based on a comparison of the traffic value with a corresponding traffic policy associated with the one hash-based range for the one identified traffic class with a traffic value.

20. The one or more non-transitory tangible media of claim 17, further operable for causing at least one second network device, along the at least one routing arc between the network device and the corresponding second edge, to respond to the management frame based on outputting to the network device a response specifying whether the change in load balancing can be executed to reduce traffic in the network device, independent of any corresponding arc cursor of the at least one routing arc.

* * * * *